A. J. F. SNOWDEN.
AUTOMATIC LAMP TURNER.
APPLICATION FILED MAY 4, 1917.

1,248,191.

Patented Nov. 27, 1917.
2 SHEETS—SHEET 1.

Inventor
A. J. F. Snowden.

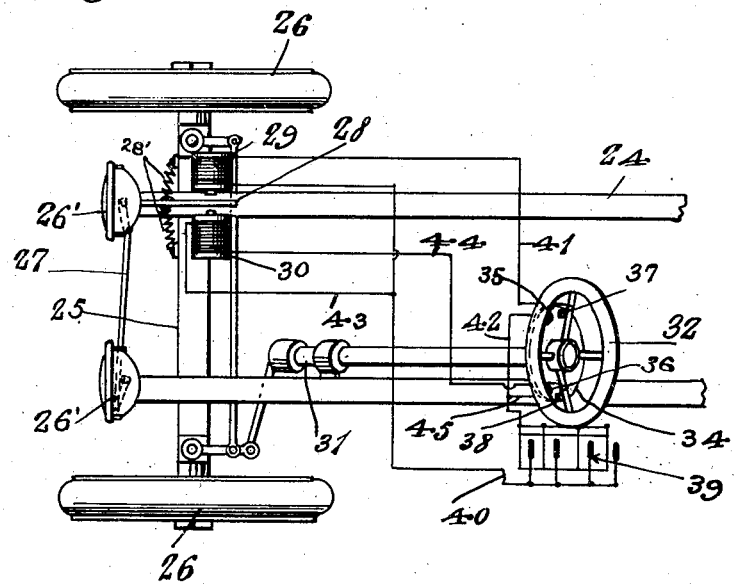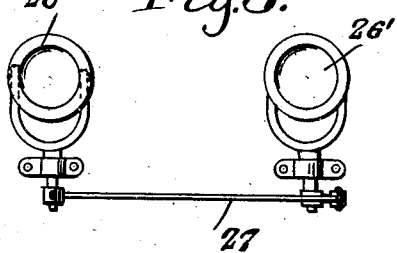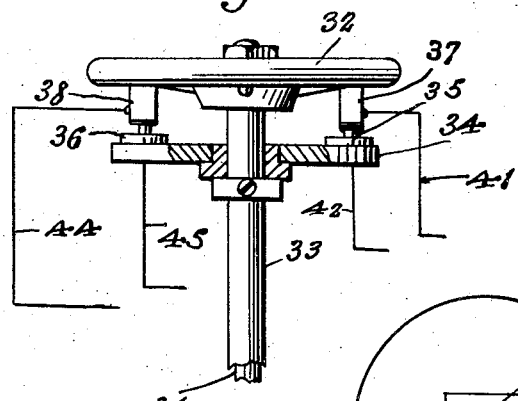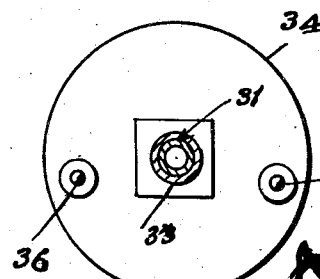

UNITED STATES PATENT OFFICE.

AUSTIN J. F. SNOWDEN, OF HUNTINGTON, INDIANA, ASSIGNOR OF ONE-HALF TO FRANK SHIDELER, OF HUNTINGTON, INDIANA.

AUTOMATIC LAMP-TURNER.

1,248,191.   Specification of Letters Patent.   Patented Nov. 27, 1917.

Application filed May 4, 1917. Serial No. 166,430.

*To all whom it may concern:*

Be it known that I, AUSTIN J. F. SNOWDEN, a citizen of the United States, residing at Huntington, in the county of Huntington and State of Indiana, have invented certain new and useful Improvements in Automatic Lamp-Turners; and I do hereby declare the following to be a full, clear, and exact description of the invention, such as will enable others skilled in the art to which it appertains to make and use the same.

This invention relates to improvements in automatic lamp turners and more particularly to an electrical means for turning the headlights upon a vehicle, such as a car, or automobile.

Another object of this invention is the provision of a headlight pivoted to the vehicle and adapted to be turned in the direction of travel of the automobile by an automatic electrical means.

A further object of this invention is the provision of relatively spaced magnets having positioned therebetween an arm carried by the headlight, whereby upon energizing either of the magnets according to the direction of the turn of the vehicle, the headlight will be turned in a corresponding direction to illuminate the path of the vehicle at all times.

A still further object of this invention is the provision of an automatic lamp turner of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

Figure 1:
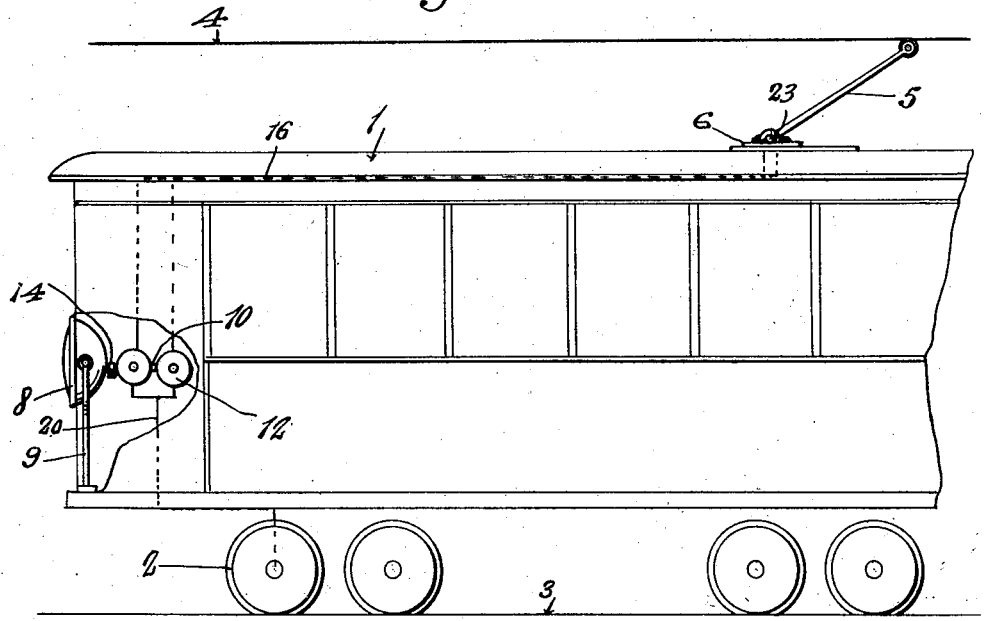
Figure 2:
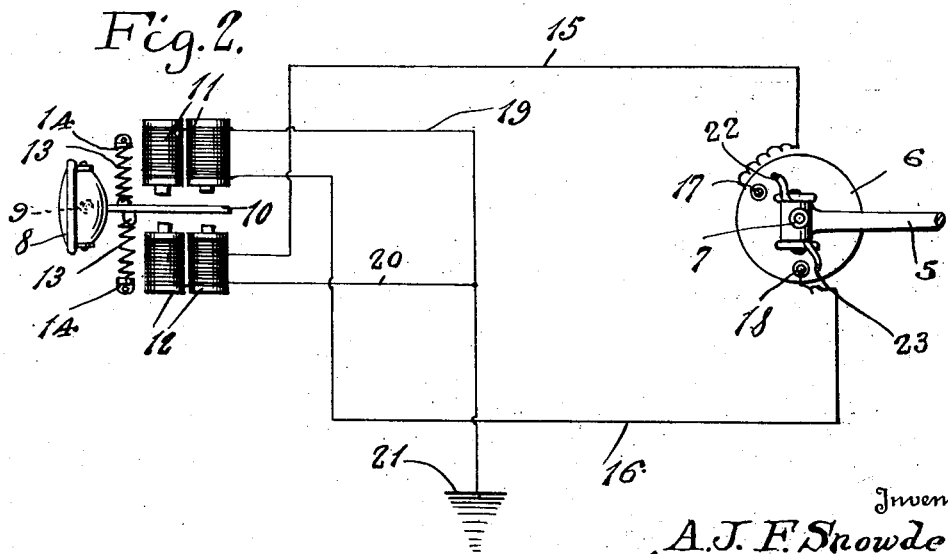

For a complete understanding of my invention, reference is to be had to the following description and accompanying drawings, in which:

Figure 1 is a fragmentary side elevation of an electric car illustrating an automatic lamp turner applied thereto and constructed in accordance with my invention, Fig. 2 is a diagrammatical view of the wiring diagram for the same, Fig. 3 is a fragmentary top plan view of an automobile chassis and steering mechanism illustrating the automatic lamp turner applied thereto, Fig. 4 is a fragmentary sectional view of the steering mechanism illustrating the contacts thereon, Fig. 5 is a fragmentary front elevation illustrating the means for connecting the headlights of the automobile together, Fig. 6 is a longitudinal sectional view illustrating the means of supporting the permanent contacts upon the steering post of the automobile.

Referring in detail to the drawings, the numeral 1 indicates an electric car mounted upon wheels 2, which travel upon a track 3. The car 1 receives electricity from the trolley wire 4 by way of a trolley pole 5. The trolley pole 5 is pivotally mounted upon a turn table 6, as shown at 7. The turn table 6 is carried by the top of the car 1.

A headlight 8 is pivotally mounted upon the car by a standard 9 and has formed thereon, a rearwardly extending arm 10, which is constructd from malleable material, which is positioned between pairs of magnets 11 and 12. The member 10 is normally held centered between the pairs of magnets 11 and 12 by coiled springs 13, which are connected to the member 10 and to brackets 14 carried by the car 1.

Conductors 15 and 16 are connected to the magnets 12 and 11 and to contacts 17 and 18, which are carried by the turn table 6. Ground wires 19 and 20 are connected to the magnets 11 and 12 and to a ground 21, which may be through the car to the track 3. Movable contacts 22 and 23 are carried by the trolley pole 5, whereby when the car is turning to the left, the contacts 18 and 23 complete an electric circuit to the magnet 11, which attract the member 10 and turn the headlight 8 to the left, thus illuminating the curve while the car is traveling thereon. The contacts 18 and 23 are caused to engage with each other upon the curve, owing to the fact that the trolley 5 follows the wire 4 when the body 1 of the car swings outwardly upon the outside of the curve, thus causing the contacts 18 and 23 to engage with each other. When the car turns to the right, the contacts 17 and 22 will move into engagement with each other completing an electric circuit to the magnet 12, attracting the member 10, swinging the headlight 8 to the right. After the car has passed from the curve and the contacts have become disengaged from each other, the member 10 returns to its normal position under the influence of the springs 13, holding the headlight 8 directly ahead of the car so that the rays of the light will be directed upon the track.

Referring to Figs. 3 to 6 inclusive, in which there is illustrated my invention applied to an automobile, it consists of the chassis 24 carried by the front axle 25 on which the front wheels 26 are journaled. Carried by the forward end of the chassis 24 are headlights 26', which are capable of moving with relation to the chassis 24 by any suitable journals. The headlights 26' are connected by a bar 27, which causes said headlights to move in unison. A metal bar or arm 28 is connected to one of the headlights 26' and extends rearwardly between magnets 29 and 30, carried by the chassis 24. The chassis 24 has mounted thereon, the usual steering post 31 carrying the steering wheel 32. The steering post 31 has mounted thereon the usual casing 33, which remains stationary and to which is secured a plate 34 carrying contacts 35 and 36. The steering wheel 32 carries contacts 37 and 38. A storage battery 39 has connected thereto, a conductor 40, which is connected to the magnet 29. A conductor 41 is connected to the magnet 29 and to the contact 37. A conductor 42 is connected to the contact 35 and connected to the storage battery 39. A conductor 43 is connected to the conductor 40 and to the magnet 30. A conductor 44 is connected to the magnet 30 and to the contact 38. A conductor 45 is connected to the contact 36 and to the conductor 42, whereby upon turning the steering wheel 32 to the right to steer the automobile to the right, the contacts 36 and 38 engage each other and complete an electric circuit to the magnet 30, which causes said magnets to attract the arm 28 and turn the headlights 26' to the right. When steering the automobile to the left, the steering wheel 32 is turned to the left, which causes the contact 37 to engage the contact 35 completing an electric circuit to the magnet 29, which attracts the arm 28, turning the headlights to the left, thus it will be seen that when the automobile is turned either to the right or left, the headlights are automatically turned in a corresponding direction so as to illuminate the roadway, while traveling upon a curve.

Coiled springs 28' are connected to the bar or arm 28 and to the automobile for retaining the headlights of the automobile in their normal position or so that the rays of light from the headlights will be directed straight ahead of the automobile.

While I have shown and described the preferred embodiment of my invention, it will be understood that minor changes in construction, combination and arrangement of parts may be made without departing from the spirit and scope of the invention as claimed.

Having thus described my invention, what I claim is:

The combination with a car including a trolley pole and a feed wire, of a headlight pivotally mounted on the car, an arm carried by the headlight, oppositely disposed coiled springs connected to the arm and to the car, magnets positioned upon each side of the arm, contacts carried by the car, means for electrically connecting the contacts with the magnets, means for grounding the magnets, and contacts on the trolley pole to engage the first named contacts upon turning of the car to energize the magnets for causing the headlight to move in a corresponding direction with the car.

In testimony whereof I affix my signature in presence of two witnesses.

AUSTIN J. F. SNOWDEN.

Witnesses:
   CLAUDE CLINE,
   GLADYS GROSSMAN.

Copies of this patent may be obtained for five cents each, by addressing the "Commissioner of Patents, Washington, D. C."